United States Patent
Wang et al.

(10) Patent No.: US 7,903,003 B2
(45) Date of Patent: Mar. 8, 2011

(54) ELECTRONIC MODULE WITH TRACK IDENTIFICATION FUNCTION AND KEYPAD IDENTIFICATION FUNCTION

(75) Inventors: Shyh-Pyng Wang, Taipei (TW); Chin-Hsin Hsu, Taipei (JP)

(73) Assignee: ASUSTek Computer Inc., Taipei (TW)

( * ) Notice: Subject to any disclaimer, the term of this patent is extended or adjusted under 35 U.S.C. 154(b) by 873 days.

(21) Appl. No.: 11/463,006

(22) Filed: Aug. 8, 2006

(65) Prior Publication Data

US 2007/0035419 A1    Feb. 15, 2007

(30) Foreign Application Priority Data

Aug. 10, 2005  (TW) .............................. 94127113 A

(51) Int. Cl.
*H03M 11/00*   (2006.01)
(52) U.S. Cl. ................. 341/34; 341/22; 178/18.01; 345/173
(58) Field of Classification Search ........... 341/22, 341/34; 345/173; 178/18.01
See application file for complete search history.

(56) References Cited

U.S. PATENT DOCUMENTS

| 6,388,660 | B1 * | 5/2002 | Manser et al. | ............... 345/173 |
| 2003/0201982 | A1 * | 10/2003 | Iesaka | ........................ 345/168 |

FOREIGN PATENT DOCUMENTS

| CN | 1197360 | 10/1998 |
| CN | 1538267 | 10/2004 |
| TW | 568309 | 12/2003 |
| TW | M243730 | 9/2004 |

* cited by examiner

*Primary Examiner* — Timothy Edwards, Jr.
(74) *Attorney, Agent, or Firm* — Jianq Chyun IP Office

(57) ABSTRACT

An electronic module with a track identification function and a keypad identification function is provided. The electronic module includes a touch-control element and a driver. The driver has a track identification mode and a keypad identification mode. When the driver receives a switch signal, the driver mode is switched between the track identification mode and the keypad identification mode. In the keypad identification mode, the touch-control element has at least a key position. When a user presses the key position, the driver provides a key command. In the track identification mode, the driver provides a cursor position signal.

5 Claims, 3 Drawing Sheets

ELECTRONIC MODULE WITH TRACK IDENTIFICATION FUNCTION AND KEYPAD IDENTIFICATION FUNCTION

CROSS-REFERENCE TO RELATED APPLICATION

This application claims the priority benefit of Taiwan application serial no. 94127113, filed on Aug. 10, 2005. All disclosure of the Taiwan application is incorporated herein by reference.

BACKGROUND OF THE INVENTION

1. Field of the Invention

The present invention relates to an electronic module. More particularly, the present invention relates to an electronic module with track identification function and keypad identification function.

2. Description of the Related Art

In this information age, people's reliance on electronic products is increasing every day. With increased performance and portability in our working and lives, many types of electronic modules, such as notebook computers, mobile phones, personal digital assistants (PDAs), have become indispensable tools for modern people.

Each of the aforementioned modules has a man-machine interface, such as a keyboard, a mouse or a trackpad, so that a user can input commands to operate the device through the man-machine interface. Using the trackpad as an example, the system can display the cursor in any position according to the signal sensed by the trackpad when the user touches the trackpad. Furthermore, the cursor can be moved to an application program location (or an icon) which the user want to execute. The system can execute the application program, such as a document-editing program when the user double clicks the trackpad. Thereafter, the user may use a keypad or a keyboard to feed in the required data and the system will display information according to the signal representing the keys.

Using a notebook computer as an example, the trackpad and the mouse are the main input interface for moving the position of the cursor and the keyboard is the main input interface for inputting text and numbers. However, in order to reduce the number of keys in the keypad of a notebook computer, additional number keys are often not provided. Instead, a functional key switching method is used to share the number keys with other textual keys. For a computer user accustomed to using separate textual keys and numeric keys, having to switch a shared key between text and number is a great inconvenience and can cause a significant slowdown in data entry for them.

SUMMARY OF THE INVENTION

Accordingly, at least one objective of the present invention is to provide an electronic module having a touch-control element and a driver with a track identification function and a keypad identification function.

To achieve these and other advantages and in accordance with the purpose of the invention, as embodied and broadly described herein, the invention provides an electronic module with track identification function and keypad identification function. The electronic module comprises a touch-control element and a driver. The driver is electrically connected to the touch-control element. The driver has a track identification mode and a keypad identification mode. When the driver receives a switch signal, the driver mode is switched between the track identification mode and the keypad identification mode. In the keypad identification mode, the touch-control element has at least a key position. When the key position is pressed, the driver provides a key command. In the track identification mode, the driver provides a cursor position signal.

In one preferred embodiment of the present invention, the driver is a custom-made IC (ASIC), for example.

In one preferred embodiment of the present invention, the switch signal received by the driver is produced by executing an application program. In addition, the electronic module may further comprise a predetermined switching key. The switch signal of the driver is produced through pressing the predetermined switching key. Furthermore, the switch signal of the driver is obtained by moving along a specified trace over the touch-control element, or alternatively, by pressuring a specified region in the touch-control element.

According to one preferred embodiment of the present invention, the touch-control element has a circuit board and a plurality of sensing circuits, for example. The sensing circuits are layout on one surface of the circuit board. In addition, the electronic module may further include a plastic film attached to the said surface of the circuit board. Furthermore, the plastic film may include a plurality of grid lines partitioning the surface into one or more key positions.

In the present invention, a driver capable of switching between a track identification mode and a keypad identification mode is used to provide corresponding the cursor position signal or key commands. Hence, the user can input data at a higher speed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
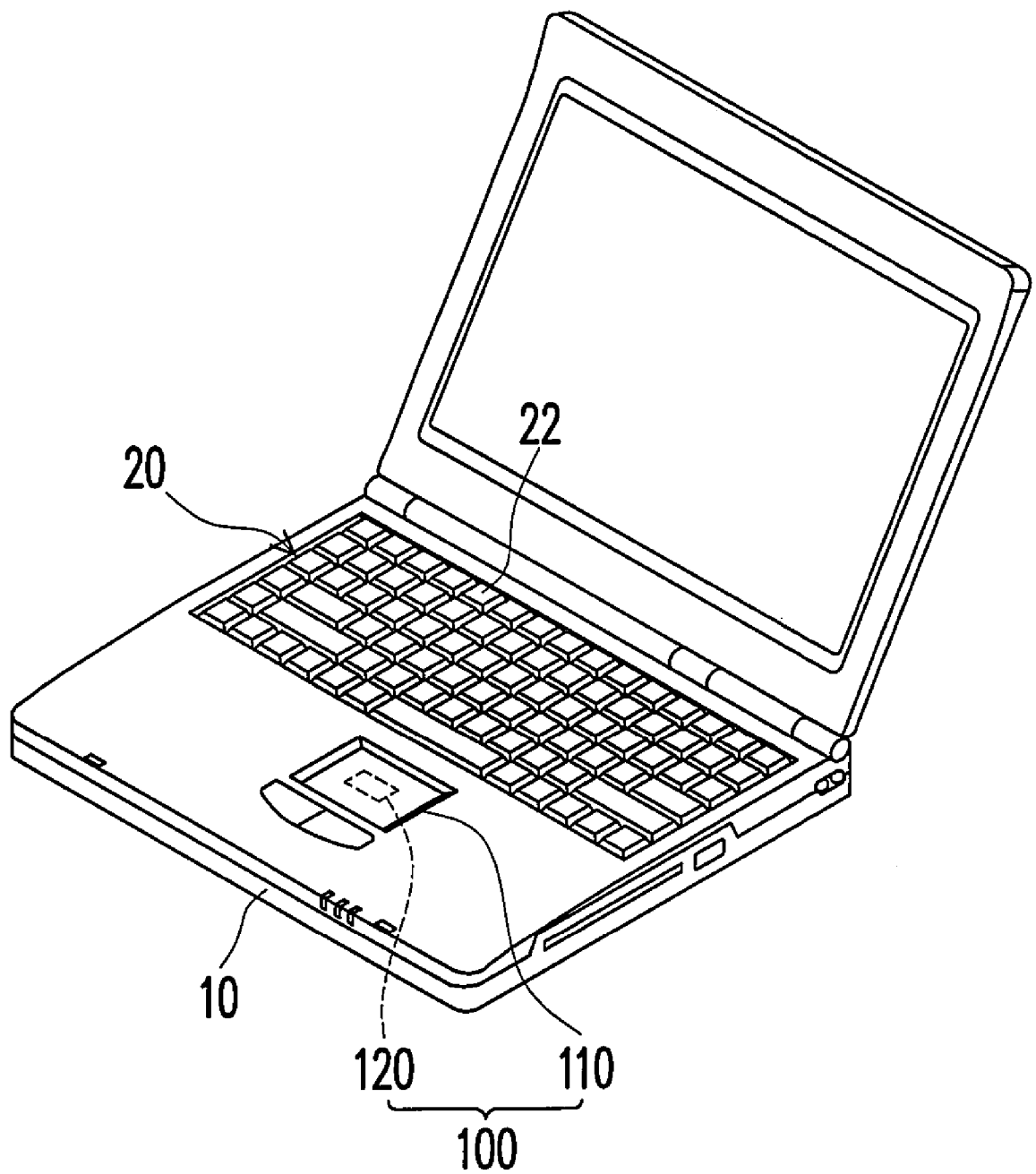
FIG. 1 is a perspective view of an electronic module assembled to a host body according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the preferred embodiment of the present invention, the electronic module is implemented in a notebook computer. In an alternative embodiment, the electronic module can be implemented in a mobile phone, a personal digital assistant (PDA) or a digital MP3 player. FIG. 1 shows the electronic module assembled to a host body according to the preferred embodiment of the present invention. As shown in FIG. 1, the electronic module 100 includes a touch-control element 110 and a driver 120. The touch-control element 110 is installed on one surface of the host body 10 of a notebook computer, and is exposed on the surface of the host body 10 so that the user can input commands (or data) and control the cursor through the touch-control element 110. The driver 120 is electrically connected to the touch-control element 110. Furthermore, the driver 120 has two operating modes, including a track identification mode and a keypad identification mode.

Figure 2:
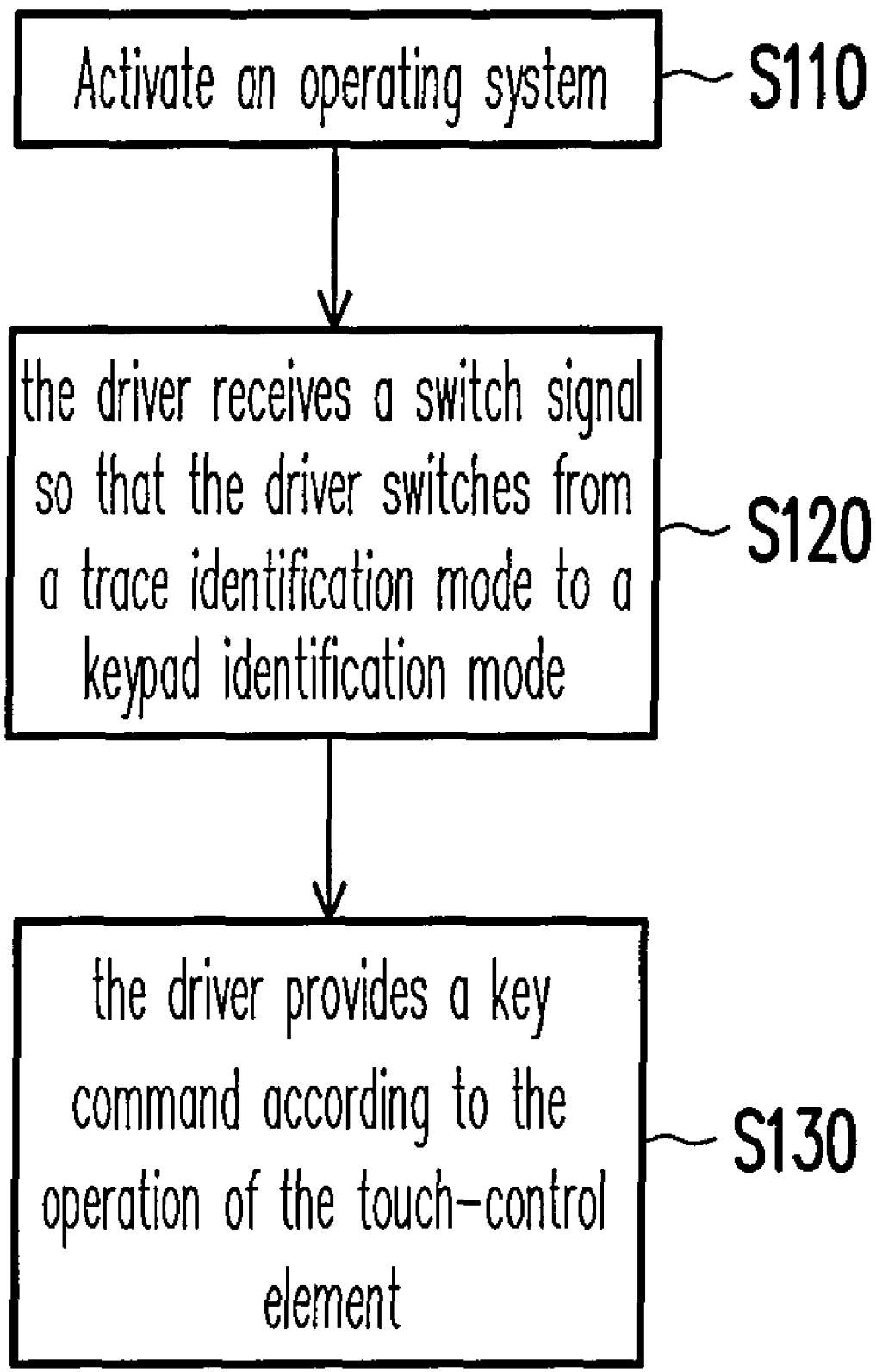
FIG. 2 is a flow diagram showing the steps for operating an electronic module according to one preferred embodiment of the present invention.
Figure 3:
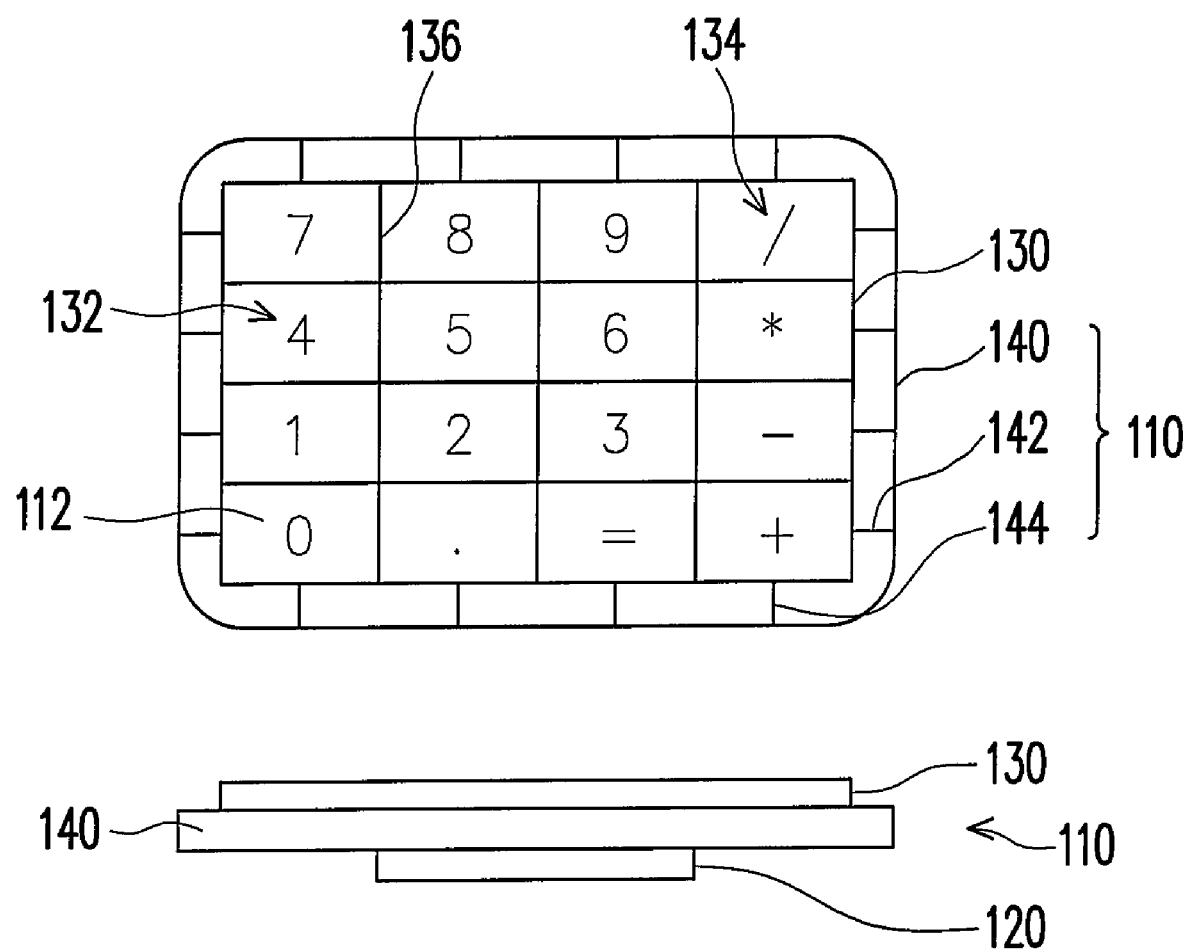
FIG. 3 shows a top view and a side view of a plastic film applied to a touch-control element of the preferred embodiment of the present invention.

FIG. 2 is a flow diagram showing the steps for operating an electronic module according to one preferred embodiment of the present invention. Please refer to FIG. 2 and FIG. 1 to depict the operation of the electronic module 100. First, as shown in step S110, an operating system (OS) is activated. The operating system has the capability of checking the hardware and determining if it is working normally. Furthermore, the operating system can set up the initial operating mode of the driver 120 and the touch-control element 110, for example, the operating system can set up the driver 120 in the track identification mode. When the driver 120 is in the track identification mode, the driver 120 can provide a cursor position signal according to the operation of the touch-control element 110. In step S120, the driver 120 switches from the track identification mode to the keypad identification mode when the driver 120 receives a switch signal. Thereafter, in the keypad identification mode as shown in step S130, the touch-control element 110 may include one or more key positions 112 (as shown in FIG. 3). The driver 120 can provide a key command according to the operation of any key position 112 of the touch-control element 110 to simulate the keyboard operation. In other words, the surface of the touch-control element 110 may be separated into a plurality of predetermined touch areas which correspond to one of number keys including operator keys, respectively. Therefore, when one of the predetermined touch areas is pressed, the driver 120 provides a corresponding key command.

Furthermore, in the track identification mode, when the user presses the contact-control element 110 with a finger and moves the finger a certain distance on the contact-control element 110, the driver 120 will convert the pressure signal into a cursor position signal to display the cursor on a screen of the notebook computer. Then, the user can move the cursor to point and select an icon or a file folder to execute. Besides, the user can double click the touch-control element 110 to control the system to execute the application program or open the indicated data file, for example, textual or computational document-editing application program or text file. Thereafter, the user can use a keyboard 20 (as shown in FIG. 1) to input the operational symbols or numeric symbols and the display of the notebook computer displays those letters or numbers represented by the signal from the keys 22 of the keyboard 20 (as shown in FIG. 1).

Please refer to FIG. 2 and FIG. 3, the user may not wish to input operational symbols 134 or numeric symbols 132 through the keyboard 20 but want to input the operational symbols 134 or numeric symbols 132 through the touch-control element 110 instead. In this case, the user can press a predetermined switching key on the keyboard 20 to generate a switch signal to send to the driver 120. In an alternative embodiment, the switch signal may be generated by executing an application program or pressing a set of key. For instance, the user can double clicks an icon which is a software hot key to generate the switching key. After receiving the switch signal, the driver 120 switches from the original track identification mode to the keypad identification mode. When the user presses one key position (touch area) 112 on the touch-control element 110, the driver 120 provides a key command and controls the system to display a numeric symbol, such as a number (2), on the screen so that the conventional shared text/numeric key mode on a conventional keyboard is replaced.

FIG. 3 shows a top view and a side view of a plastic film applied to a touch-control element of the preferred embodiment of the present invention. The plastic film 130 is made from a black plastic material and is selectively attached to the sensing circuits 142, 144 of a circuit board 140, for instance. The sensing circuits 142, 144 cross over each other to form a network of grids for detecting the pressure signal generated by the user pressing and determining the relative location pressed by the user, and then the sensing circuits 142, 144 transmits the pressure signal to the driver 120. In this embodiment, the driver 120 is a specifically manufactured custom-made IC (ASIC) that includes a track identification function and a keypad identification function. It should be noted that when the driver is in the keypad identification mode, if two or more key positions 112 on the touch-control element 110 are pressed simultaneously, the driver 120 may regard such pressing action as invalid and refrain from outputting anything. Alternatively, if the pressured location accidentally lies on the grid line 136, the driver 120 may regard the pressing action as invalid and provide no output as well.

In addition, the plastic film 130 may include a plurality of numeric symbols 132 such as the Arabic numerals 0~9 and the decimal and operational symbols 134 such as the plus, subtract, multiply and divide symbols printed on various locations, for example. Furthermore, grid lines 136 may also be printed on the plastic film 130 to demarcate the location of various keys 112. Obviously, it is possible to print only grid lines 136 on the plastic film 130 without any numeric symbols 132 and operational symbols 134 so that the user can define the symbols in each key position 112.

As shown in FIG. 3, beside pressing a keypad or executing an application program, the switch signal can also be produced by moving across the touch-control element 110 following a specified trace (for example, a trace formed by moving along the edge of the touch-control element 110 for half a circle) or pressing a specified region of the touch-control element 110. Obviously, when the user uses the aforesaid method to produce the switch signal again, the driver can revert from the keypad identification mode back to the track identification mode for providing a cursor position signal.

As described above, the preferred embodiment of the present invention uses a driver capable of switching between a track identification mode and a keypad identification mode to provide a cursor position signal or a key command to the system. When the driver operates in the track identification mode, the driver provides a cursor position signal so that the display of the system can display the cursor. On the other hand, when the driver operates in the keypad identification mode, the driver provides a key command to emulate the operation of a keyboard. Therefore, in the presence of both the track identification mode and the keypad identification mode, the electronic module can avoid the switching operation needed for sharing text/numeric keys in the conventional keyboard and speed up the input of data into the system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic module having a track identification function and a keypad identification function, comprising:
   a touch-control element; and
   a driver electrically connected to the touch-control element, wherein the driver has a track identification mode and a keypad identification mode operated by a software such that the driver can switch between the track identification mode and the keypad identification mode through receiving a switch signal,
   wherein the switch signal received by the driver is produced through moving along a pre-determined trace over the touch-control element;
   when the driver is in the keypad identification mode, the touch-control element further includes at least a key position such that the driver provides a key command when the key position is pressed; and
   when the driver is in the track identification mode, the driver provides a cursor position signal.

2. The electronic module of claim 1, wherein the touch-control element further includes a circuit board and a plurality of sensing circuits such that the sensing circuits are laid on one surface of the circuit board.

3. The electronic module of claim 1, wherein the driver comprises a custom-made IC (ASIC).

4. The electronic module of claim 2, wherein the electronic module further includes a plastic film attached to the surface of the circuit board.

5. The electronic module of claim 4, wherein the plastic film further includes a plurality of grid lines partitioning the film into at least a key position.

* * * * *